(12) United States Patent
Shirai

(10) Patent No.: US 10,589,368 B2
(45) Date of Patent: Mar. 17, 2020

(54) MACHINE LEARNING DEVICE HAVING FUNCTION OF ADJUSTING WELDING POSITIONS OF CORE IN WIRE ELECTRIC DISCHARGE MACHINE

(71) Applicant: FANUC Corporation, Yamanashi (JP)

(72) Inventor: Kenichiro Shirai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/508,328

(22) Filed: Jul. 11, 2019

(65) Prior Publication Data

US 2019/0329341 A1    Oct. 31, 2019

Related U.S. Application Data

(62) Division of application No. 15/361,493, filed on Nov. 28, 2016, now Pat. No. 10,442,023.

(30) Foreign Application Priority Data

Nov. 30, 2015    (JP) .................................. 2015-233294

(51) Int. Cl.
*B23H 5/00*    (2006.01)
*G05B 19/402*    (2006.01)
(Continued)

(52) U.S. Cl.
CPC ................ *B23H 5/00* (2013.01); *B23H 9/00* (2013.01); *G05B 13/0265* (2013.01);
(Continued)

(58) Field of Classification Search
CPC ... B23H 5/00; B23H 9/00; B23H 7/02; B23H 7/20; G06N 20/00; G05B 13/0265; G05B 19/25; G05B 19/402; G05B 2219/45221
(Continued)

(56) References Cited

U.S. PATENT DOCUMENTS

| 5,242,555 A | 9/1993 | Buhler |
|---|---|---|
| 5,556,554 A | 9/1996 | Morishita |

(Continued)

FOREIGN PATENT DOCUMENTS

| EP | 2684633 A2 | 1/2014 |
|---|---|---|
| JP | H4-354653 A | 12/1992 |

(Continued)

OTHER PUBLICATIONS

Office Action in JP Application No. 2015-233294, dated Nov. 21, 2017, 6pp.

(Continued)

*Primary Examiner* — Dzung Tran
(74) *Attorney, Agent, or Firm* — Hauptman Ham, LLP

(57) ABSTRACT

A machine learning device, performing machine learning for adjusting a position and a length of a welding part when a core is welded to a workpiece in a wire electric discharge machine, acquires the position and the length of the welding part as state data; sets reward conditions; calculates a reward based on the state data and the reward conditions; performs the machine learning of the adjustment; determines and outputs an adjustment target and its adjustment amounts based on the state data and a result of the machine learning; performs the machine learning of the adjustment based on the output adjustment action, the state data acquired based on the recalculated position and the recalculated length of the welding part, and the reward based on the state data; and outputs an optimum position of the welding part, the reward conditions being set as a positive or negative reward.

4 Claims, 8 Drawing Sheets

(51) Int. Cl.
*G05B 19/25* (2006.01)
*G05B 13/02* (2006.01)
*G06N 20/00* (2019.01)
*B23H 9/00* (2006.01)
*B23H 7/20* (2006.01)
*B23H 7/02* (2006.01)

(52) U.S. Cl.
CPC ........... *G05B 19/25* (2013.01); *G05B 19/402* (2013.01); *G06N 20/00* (2019.01); *B23H 7/02* (2013.01); *B23H 7/20* (2013.01); *G05B 2219/45221* (2013.01)

(58) Field of Classification Search
USPC ........................................................ 700/162
See application file for complete search history.

(56) References Cited

U.S. PATENT DOCUMENTS

| 6,832,126 B2 | 12/2004 | Irie |
| 2008/0201010 A1 | 8/2008 | Takagi et al. |
| 2009/0099985 A1 | 4/2009 | Tesauro et al. |
| 2012/0193326 A1 | 8/2012 | Mitsuyasu |
| 2014/0014625 A1 | 1/2014 | Yamaoka et al. |

FOREIGN PATENT DOCUMENTS

| JP | 2002-96220 A | 4/2002 |
| JP | 2007-219989 A | 8/2007 |
| JP | 2008-27225 A | 2/2008 |
| JP | 2011-204036 A | 10/2011 |
| JP | 2013-144335 A | 7/2013 |
| JP | 2013-147175 A | 8/2013 |
| JP | 2014-14907 A | 1/2014 |
| JP | 2014-24132 A | 2/2014 |

OTHER PUBLICATIONS

Extended European Search Report in EP Application No. 16195575.2, dated Mar. 16, 2017, 11pp.

K.P. Somashekhar et al., "Optimization of Material Removal Rate in Micro-EDM Using Artificial Neural Network and Genetic Algorithms", May 28, 2010, pp. 467-475, vol. 25 No. 6, Material and Manufacturing Processes, Taylor & Francis Group LLC, 10pp.

Kuo-Ming Tsai et al., "Comparisions of neural network models on material removal rate in electrical discharge machining", Nov. 1, 2001, pp. 111-124, vol. 117, No. 1-2, Journal of Materials Processing Technology, 14pp.

```
O0001
Mxx
N10G92X0.Y0.
N20G01G91Y-50.G42D1
N30X-50.
N40Y100.
N50X100.
N60Y-100.
N70X-50.
N80G40Y50.
Mxy
M30
```

```
O0001
Mxx
N10G92X0.Y0.
N20G01G91Y-50.G42D1
N30X-20.Myy
N31X-20.Mzz
N32X-10.
N40Y40.Myy
N41Y20.Mzz
N42Y40.
N50X10.Myy
N51X20.Mzz
N52X40.Myy
N53X20.Mzz
N54X10.
N60Y-40.Myy
N61Y-20.Mzz
N62Y-40.
N70X-10.Myy
N71X-20.Mzz
N72X-20.
N80G40Y50.
Mxy
M30
```

MACHINE LEARNING DEVICE HAVING FUNCTION OF ADJUSTING WELDING POSITIONS OF CORE IN WIRE ELECTRIC DISCHARGE MACHINE

RELATED APPLICATIONS

The present application is a Divisional Application of U.S. patent application Ser. No. 15/361,493, filed Nov. 28, 2016, which claims priority to Japanese Patent Application Number 2015-233294, filed on Nov. 30, 2015. The disclosures of all above-listed applications are hereby incorporated by reference herein in their entirety.

BACKGROUND OF THE INVENTION

1. Field of the Invention

The present invention relates to a machine learning device and, in particular, to a machine learning device having the function of adjusting welding positions, a welding number, or the like of a core according to an environmental condition such as a shape of the core in a wire electric discharge machine.

2. Description of the Related Art

FIG. 9 is a top view of a workpiece machined by a wire electric discharge machine.

The wire electric discharge machine starts the machining of a workpiece 3 from a machining start hole 31. A machining path through which a wire electrode (not shown) passes is indicated by a machining groove 32. A machining method with a conventional wire electric discharge machine causes problems when a core 33 is cut out; for example, the cut-out core 33 and the wire electrode contact each other to cause disconnection of the wire electrode, or the wire electrode and the workpiece 3 are short-circuited via the core 33 to cause a scratch on the core 33 and the workpiece 3.

In view of the above problems, there has been employed a technology in which welding parts 34 to weld the core 33 and the workpiece 3 to each other using a molten material made by melting the wire electrode are formed during machining of the workpiece 3 at some parts of the machining groove 32 formed on the machining path, thereby preventing the core 33 from dropping upon completion of the machining. As a technology for welding the core 33 to the workpiece 3 so as to prevent the core 33 generated through electric discharge machining from dropping, Japanese Patent Application Laid-open No. 2014-024132 discloses a technology for correcting a machining program so as to evenly arrange welding pares 34 and welding suspension parts 35 on the machining path, in accordance with a shape of a core 33.

When this conventional technology is employed, it is necessary to calculate positions and lengths of the welding parts 34 on the machining path, intervals between the welding parts 34 (lengths of the welding suspension parts 35), and the number of the welding parts 34 provided on the machining path, in accordance with the shape of the core 33, and create a welding program according to the calculation results.

For example, the core 33 shown in FIG. 10A and the core 33 shown in FIG. 10B are different in shape, therefore in order to hold the respective cores 33 in a well-balanced fashion and enable their removal with reasonable force, positions and lengths of the welding parts 34, intervals between the welding parts 34 (lengths of the welding suspension parts 35), and the number of the welding parts 34 on the machining paths must be designed differently for each core 33. That is to say, it is necessary to generate different welding programs so as to correspond to the respective cores 33 having the respective shapes shown in FIG. 10A and FIG. 10B.

In order to calculate the above values (positions and lengths of the welding parts 34, lengths of the welding suspension parts 35, and the number of the welding parts 34) so as to correspond to the shapes of the cores 33, it is necessary to consider differences in balance (centroid or the like), retention ability, dropping easiness (ease with which to drop the cores), and machining easiness such that these correspond to the shapes of the cores 33. Here, consideration is given to retention ability since the cores 33 cannot be supported when the lengths or number of the welding parts 34 is too small. Dropping easiness is taken into account because when the welding parts 34 are poorly positioned or when the lengths or number of the welding parts 34 is excessive, extra force is needed to drop the cores 33 from the workpieces 3. Further, consideration is given to machining easiness because an excessive number of the welding parts 34 leads to increased number of operations to modify machining conditions during wire electric discharge machining, which consequently lengthen the machining time.

In this respect, the effect of the above technology disclosed in Japanese Patent Application Laid-open No. 2014-024132 is limited to evenly arranging the positions and lengths of the welding parts 34 on the machining path, and does not take account of the shape of the core 33 when calculating the positions, lengths, or the like of the welding parts 34. Therefore, for certain shapes of cores to be formed by electric discharge machining, the balance, retention ability, dropping easiness, and machining easiness may not be suitable.

SUMMARY OF THE INVENTION

In view of the above problems, it is an object of the present invention to provide a machine learning device having the function of adjusting welding positions.

A machine learning device according to an embodiment of the present invention, the machine learning device that performs machine learning of an adjustment of a position and a length of a welding part formed on a machining path for machining to weld a core to a workpiece when the core is cut out from the workpiece by a wire electric discharge machine that performs the machining to cut out the core from the workpiece based on machining preconditions including a program. The machine learning device including: a processor configured to: acquire, as state data on the welding part, the position and the length of the welding part and an evaluation value to evaluate the position and the length of the welding part; set reward conditions; calculate a reward based on the state data and the reward conditions; perform the machine learning of an adjustment of the position and the length of the welding part ; and determine and output (i) an adjustment target including at least one of the position and the length of the welding part and (ii) adjustment amounts of the adjustment target as an adjustment action, based on the state data and a result of the machine learning; perform the machine learning of the adjustment of the position and the length of the welding part based on (a) the output adjustment action, (b) the state data acquired based on the recalculated position and the recalculated length of the welding part, and (c) the reward calculated based on the state data acquired based on the recalculated position and the recalculated length of the welding part and upon completion of the machine learning, output an optimum position of the welding part, wherein the reward conditions are set such that the processor is configured to calculate a positive reward (a) when a number of the welding parts is small or (b) when a position for supporting the core is well balanced and such that the processor is configured to calculate a negative reward (c) when the number of the welding parts is large, or (d) when the length of the welding part is shorter than a previously-set welding-parts minimum distance, or (e) when a magnitude of a force by which the core is supported is smaller than a previously-set prescribed threshold, or (f) when a magnitude of a force for dropping the core is large, or (g) when the position for supporting the core is poorly balanced.

The evaluation value may include at least any of a force by which the core is supported calculated from the position and the length of the welding part, a force for dropping the core calculated from the position and the length of the welding part, and balance of positions for supporting the core calculated from the position and the length of the welding part.

The machine learning device may further includes: a memory configured to store the result of the machine learning, and output the stored result of the machine learning to the processor when the processor uses the result of the machine learning section.

The machine learning device may be connected to at least one further machine learning device and the processor may be further configured to mutually exchange or share the result of the machine learning with the at least one further machine learning device.

According to an embodiment of the present invention, it becomes possible to automatically determine optimum welding positions corresponding to a shape of a core in which a welding distance and a welding number are optimized so as to correspond to a force and a position for dropping the core, and automatically generate a welding program from a program.

BRIEF DESCRIPTION OF THE DRAWINGS

The above and other objects and features of the present invention will become apparent from the descriptions of the following embodiments with reference to the accompanying drawings in which.

DETAILED DESCRIPTION OF THE PREFERRED EMBODIMENTS

Figure 1:
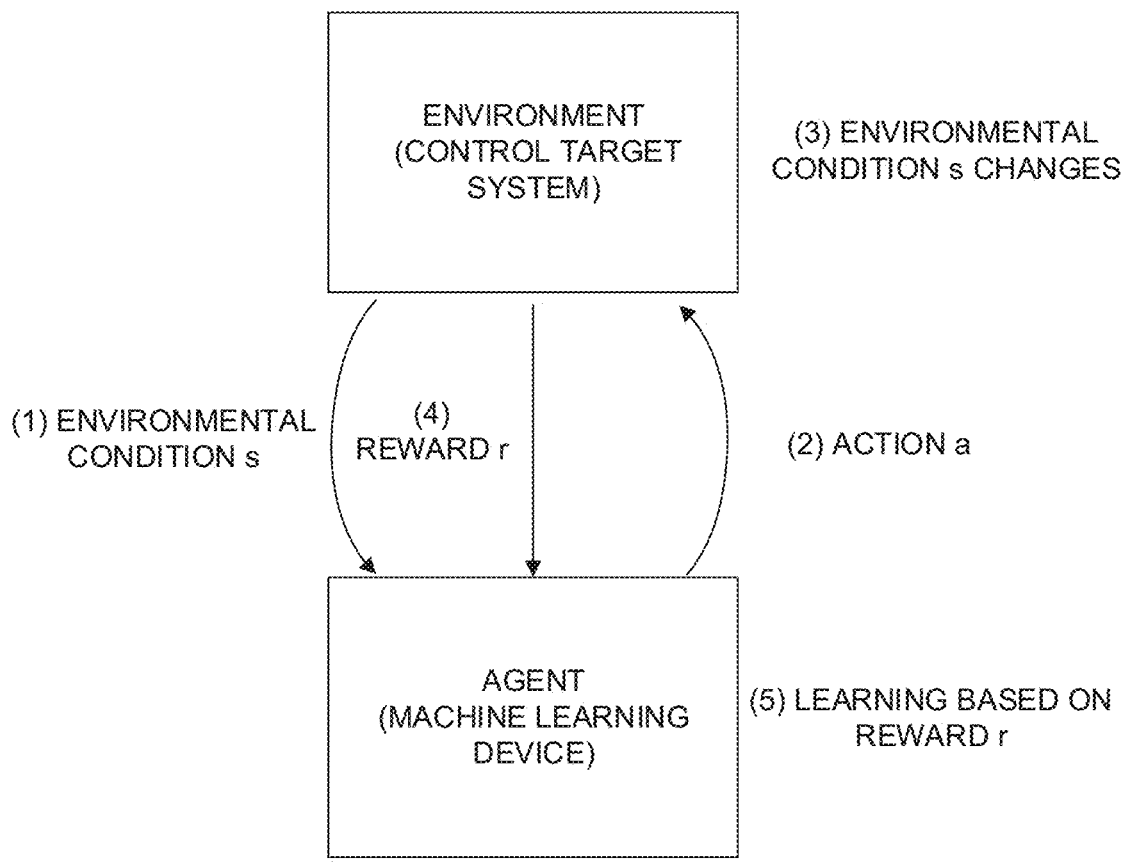
FIG. 1 is a diagram for describing the basic concept of a reinforcement learning algorithm.

In the present invention, a machine learning device serving as artificial intelligence is introduced into a simulation apparatus of a wire electric discharge machine that machines a workpiece. In a simulation performed by the simulation apparatus, values such as a shape of a workpiece (core) as a machining target, a thickness of the workpiece, a density of a workpiece material, a minimum distance between welding parts, a bearing force per welding unit length, and a force for dropping the core are given as machining preconditions. Then, with respect to the position and length ("data on machining states") of each welding part of the core in relation to a workpiece with such values being given as the machining preconditions, machine learning on the adjustment of a position and a length or each welding part of the core is performed so as to allow an optimum position and a length of each welding part corresponding to the machining preconditions to be derived.

Hereinafter, a description will be briefly given of the machine learning to be introduced into the present invention.

(1) Machine Learning

Here, machine learning will be briefly described. The machine learning is realized in such a way that useful rules, knowledge expressions, determination criteria, or the like are extracted by analysis from sets of data input to a device that performs the machine learning (hereinafter called a machine learning device), determination results of the extraction are output, and learning of knowledge is performed. Although machine learning is performed according to various methods, the methods are roughly classified into "supervised learning," "unsupervised learning," and "reinforcement, learning." In addition, in order to realize such methods, there is a method called "deep learning" by which to learn the extraction of feature amounts per se.

The "supervised learning" is a model by which sets of input and result (label) data are given to a machine learning device in large amounts to learn the features of the data sets and estimate results from inputs, i.e., a method by which the relationship between inputs and results may be inductively obtained. The method may be realized using an algorithm such as a neural network that will be described later.

The "unsupervised learning" is a learning method by which a device that learns, with the reception of only large amounts of input data, as to how the input data is distributed and applies compression, classification, shaping, or the like to the input data even if corresponding supervised output data is not given. The features of the data sets can be arranged in clusters each having similar characteristic in common. Using the results, any standard is set to allocate outputs so as to be optimized. Thus, the prediction of the outputs may be realized. In addition, as an intermediate problem setting between the "unsupervised learning" and the "supervised learning", there is a method called "semi-supervised learning" in which some parts are exclusively given sets of input and output data while the other parts are given only input data. In an embodiment, since data that may be acquired even if a machining machine does not actually operate is used in the unsupervised learning, efficient learning is allowed.

The "reinforcement learning" is a method by which to learn not only determinations or classifications but also actions to perform learning of optimum actions in consideration of interactions given to environments by actions, i.e., learning to maximize rewards that will be obtained in the future. In the reinforcement learning, a machine learning device may start learning in a state in which the machine learning device does not completely know or imperfectly knows results brought about by actions. In addition, a machine learning device may start learning from a desirable start point in an initial state in which prior learning (a method such as the above supervised learning and inverse reinforcement learning) is performed in such as way as to imitate human's actions.

Note that when machine learning is applied to a machining machine, it is necessary to consider the fact that results may be obtained as data only after the machining machine actually operates, i.e., searching of optimum actions is performed by a trial and error approach. In view of the above circumstances, the present invention employs, as the principal learning algorithm of a machine learning device, the algorithm of reinforcement learning by which the machine learning device is given rewards to automatically learn actions to achieve a goal.

FIG. 1 is a diagram for describing the basic concept of a reinforcement learning algorithm.

In reinforcement learning, by an interactions between an agent (machine learning device) acting as a learning subject and an environment (control target system) acting as a control target, learning and action of the agent are advanced. More specifically, the following interactions are performed between the agent and the environment.

(1) The agent observes an environmental condition $s_t$ at a certain time.

(2) Based on an observation result and past learning, the agent selects and performs an action at that the agent is allowed to take.

(3) The environmental condition $s_t$ changes to a next state $S_{t+1}$ based on any rule and performance of the action $a_t$.

(4) The agent accepts a reward $r_{t+1}$ based on the state change as a result of the action $a_t$.

(5) The agent advances the learning based on the state $s_t$, the action $a_t$, the reward $r_{t+1}$, and a past learning result.

At the initial stage of the reinforcement learning, the agent does not understand the standard of a value judgment for selecting the optimum action $a_t$ with respect to the environmental condition $s_t$ in the above action selection (2). Therefore, the agent, selects various actions $a_t$ in a certain state $s_t$ and learns the selection of a better action, i.e., the standard of an appropriate value judgment based on rewards $r_{t+1}$ given with respect to the actions $a_t$ at that time.

In the above learning (5), the agent acquires the mapping of an observed state $S_t$, an action $a_t$, and a reward $r_{t+1}$ as reference information for determining an amount of a reward that the agent is allowed to obtain in the future. For example, when the number of states that the agent is allowed to have at each time is m and the number of actions that the agent is allowed to take is n, the agent obtains a two-dimensional arrangement of m×n, in which rewards $r_{t+1}$ corresponding to pairs of states $s_t$ and actions $a_t$ are stored, by repeatedly performing actions.

Then, with a value function (evaluation function) indicating to what degree a state or an action selected based on the above acquired mapping is valuable, the agent updates the value function (evaluation function) while repeatedly performing actions to learn an optimum action corresponding to a state.

A "state value function" is a value function indicating to what degree a certain state $s_t$ is valuable. The state value function is expressed as a function using a state as an argument and updated based on a reward obtained with respect to an action in a certain state, a value of a future state that transitions according to the action, or the like in learning in which actions are repeated. The update formula of the state value function is defined according to a reinforcement learning algorithm. For example, in temporal-difference (TD) learning indicating as one of reinforcement learning algorithms, the state value function is updated by the following formula (1). Note that in the following formula (1), α is called a learning coefficient, γ is called a discount rate, and the learning coefficient and the discount rate are defined to fall within $0<\alpha \leq 1$ and $0<\gamma \leq 1$, respectively.

$$V(s_t) \leftarrow V(s_t) + \alpha[r_{t+1} + \gamma V(s_{t+1}) - V(s_t)] \qquad (1)$$

In addition, an "action value function" is a value function indicating to what degree an action $a_t$ is valuable in a certain state $s_t$. The action value function is expressed as a function using a state and an action as arguments and updated based on a reward obtained with respect to an action in a certain state, an action value of a future state that transitions according to the action, or the like in learning in which actions are repeated. The update formula of the action value function is defined according to a reinforcement learning algorithm. For example, in Q-learning indicating as one of typical reinforcement learning algorithms, the action value function is updated by the following formula (2). Note that in the following formula (2), α is called a learning coefficient, γ is called a discount rate, and the learning coefficient and the discount rate are defined to fall within $0<\alpha \leq 1$ and $0<\gamma \leq 1$, respectively.

$$Q(s_t, a_t) \leftarrow Q(s_t, a_t) + \alpha\left(r_{t+1} + \gamma \max_a Q(s_{t+1}, a) - Q(s_t, a_t)\right) \qquad (2)$$

The above formula expresses a method for updating an evaluation value $Q(s_t, a_t)$ of an action $a_t$ in a state $s_t$ based on a reward $r_{t+1}$ returned as a result of the action $a_t$. It is indicated by the formula that $Q(s_t, a_t)$ is increased if an evaluation value $Q(s_{t+1}, \max(a))$ of the best action max(a) in a next state as a result of the reward $r_{t+1}$ and the action $a_t$ is greater than the evaluation value $Q(s_t, a_t)$ of the action $a_t$ in the state $s_t$, while $Q(s_t, a_t)$ is decreased if not. That is, a value of a certain action in a certain state is made closer to a value of a reward immediately returned as a result of the action and the best action in a next state accompanied by the action.

In Q-learning, such an update is repeatedly performed to finally set $Q(s_t, a_t)$ at an expected value $E(\Sigma \gamma^t r_t)$ (the expected value is one taken when a state is changed according to an optimum action. Since the expected value is unknown as a matter of course, it is necessary to learn the expected value by search.).

Further, in the above action selection (2), an action $a_t$ by which a reward $(r_{t+1}+r_{t+2}+ \ldots)$ over a future becomes maximum in a current state $s_t$ (an action for changing to a most valuable state in case where a state value function is used, or a most valuable action in the state in case where an action value function is used) is selected using a value function (evaluation function) generated by past learning. Note that during learning, an agent may select a random action with a constant probability for the purpose of advancing the learning in the selection of an action in the above action selection (2) (ε greedy method).

Note that in order to store a value function (evaluation function) as a learning result, there are a method for retaining values of all the pairs (s, a) of states and actions in a table form (action value table) and a method for preparing a function for approximating the above value function. According to the latter method, the above update formula may be realized by adjusting parameters of an approximate function based on a method such as method for probabilistic gradient descent. For the approximate function, a supervised learning device such as a neural network may be used.

Figure 2:
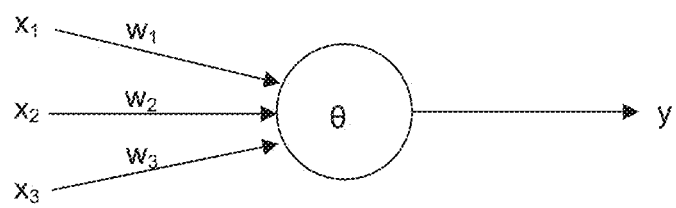
FIG. 2 is a schematic diagram showing a neuron model.

The neural network is constituted by a calculation unit, a memory, and the like that realize a neural network following a neuron model as shown in, for example, FIG. 2. FIG. 2 is a schematic diagram showing a neuron model.

As shown in FIG. 2, a neuron outputs an output y with respect to a plurality of inputs x (here, inputs $x_1$ to $x_3$ as an example). A corresponding weight w ($w_1$ to $w_3$) is placed on each of the inputs $x_1$ to $x_3$. Thus, the neuron outputs the output y expressed by the following formula (3). Note that in the following formula (3), an input x, an output y, and a weight w are all vectors. In addition, θ indicates a bias, and $f_k$ indicates an activation function.

$$y=f_k(\Sigma_{i=1}^n x_i w_i - \theta) \quad (3)$$

Next, a description will be given, with reference to FIG. 3, of a neural network having weights of three layers in which the above neurons are combined together.

Figure 3:
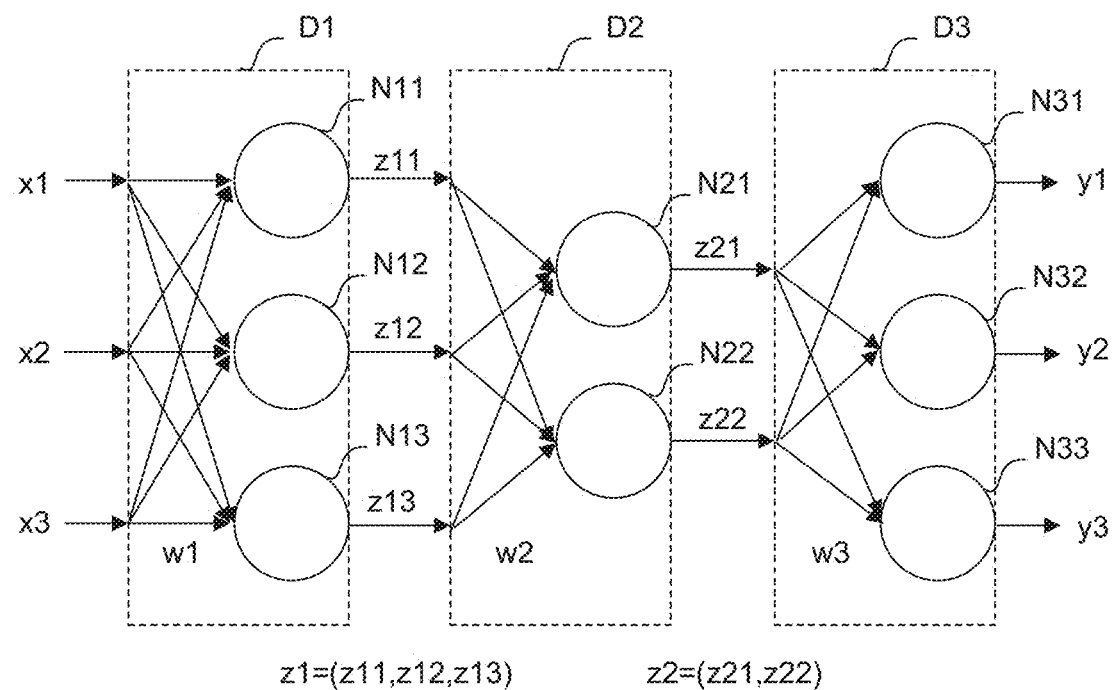
FIG. 3 is a schematic diagram showing a neural network having weights of three layers.

FIG. 3 is a schematic diagram showing a neural network having weights of three layers D1 to D3. As shown in FIG. 3, a plurality of inputs x (here, inputs x1 to x3 as an example) is input from the left side of the neural network, and results y (here, results y1 to y3 as an example) are output from the right side of the neural network.

Specifically, when inputs x1 to x3 are input to three neurons N11 to N13, corresponding weights are placed on the inputs x1 to x3. The weights placed on the inputs are collectively indicated as w1. The neurons N11 to N13 output z11 to z13, respectively. Z11 to Z13 are collectively indicated as a feature vector z1, and may be regarded as vectors obtained by extracting feature amounts of the input vectors. The feature vector z1 is a feature vector between the weight w1 and a weight w2.

When z11 to z13 are input to two neurons N21 and N22, corresponding weights are placed on these z11 to z13. The weights placed on the feature vectors are collectively indicated as w2. The neurons N21 and N22 output z21 and z22, respectively. z21 and z22 are collectively indicated as a feature vector z2. The feature vector z2 is a feature vector between the weight w2 and a weight w3.

When the feature vectors z21 and z22 are input to three neurons N31 to N33, corresponding weights are placed on these feature vectors z21 and z22. The weights placed on the feature vectors are collectively indicated as w3.

Finally, the neurons N31 to N33 output the results y1 to y3, respectively.

The operation of the neural network includes a learning mode and a value prediction mode. A learning data set is used to learn the weight w in the learning mode, and the parameters are used to determine the action of a machining machine in the prediction mode (here, "prediction" is only for the sake of convenience, but various tasks such as detection, classification, and deduction may be included).

It is possible to immediately learn data obtained when a machining machine actually operates in the prediction mode and reflect the learning data on a next action (online learning), or is possible to perform collective learning using a previously-collected data group and thereafter perform a detection mode using the parameters at all times (batch learning). It is also possible to perform an intermediate mode i.e., a learning mode that is performed every time data is accumulated by a certain degree.

Learning of the weights w1 to w3 is made possible by error back propagation. Error information enters from the right side and flows to the left side. The error back propagation is a method for adjusting (learning) each of the weights to reduce a difference between the output y obtained when the input x is input and a real output y (supervised) for each of the neurons.

The neural network may have three or more layers (called deep learning). It is possible to automatically obtain a calculation unit that extracts the features of inputs on a step-by-step basis and performs the regression of a result only from supervised data.

When such a neural network is used as an approximate function, the above value function (evaluation function) may be stored as the neural network to advance learning while the above actions (1) to (5) in the above reinforcement learning is repeatedly performed.

Even in a new environment after the completion of learning in a certain environment, the learning may be advanced so as to be adapted to the new environment by additional learning. Accordingly, as in the present invention, by applying the learning to an adjustment of a position and a length of each welding part of a core in a simulation apparatus of a wire electric discharge machine, it becomes possible to perform the learning of the adjustment of a position and a length of each welding part of the core in a short time, by performing additional learning under new machining preconditions on the learning of the adjustment of a position and a length of each welding part of a past core, even when the new machining preconditions (a shape of a workpiece as a machining target, a thickness of the workpiece, a density of a workpiece material, a minimum distance between welding parts, a bearing force per welding unit length, a force for dropping the core, or the like) are applied to the learning.

In addition, reinforcement learning employs a system in which a plurality of agents is connected to each other via a network or the like, and information on states s, actions a, rewards r, or the like is shared between the agents and applied to each learning, whereby each of the agents performs dispersed reinforcement learning in consideration of the environments of the other agents to be allowed to perform efficient learning.

Also in the present invention, when a plurality of agents (machine learning devices) incorporated in a plurality of environments (simulation apparatuses of wire electric discharge machines) performs dispersed machine learning in a state of being connected to each other via a network or the like, learning of the adjustment of a position and a length of each welding part of a core in the simulation apparatuses of the wire electric discharge machines may be efficiently performed.

Note that although various methods such as Q-learning, an SARSA method, TD learning, and an AC method have been commonly known as reinforcement learning algorithms, any of the above reinforcement algorithms may be applied to the present invention. Since each of the reinforcement learning algorithms has been commonly known, its detailed description will be omitted in the specification.

Hereinafter, a description will be given, based on a specific embodiment, of the simulation apparatus of a wire electric discharge machine of the present invention into which a machine learning device is introduced.

(2) Embodiment

Figure 4:
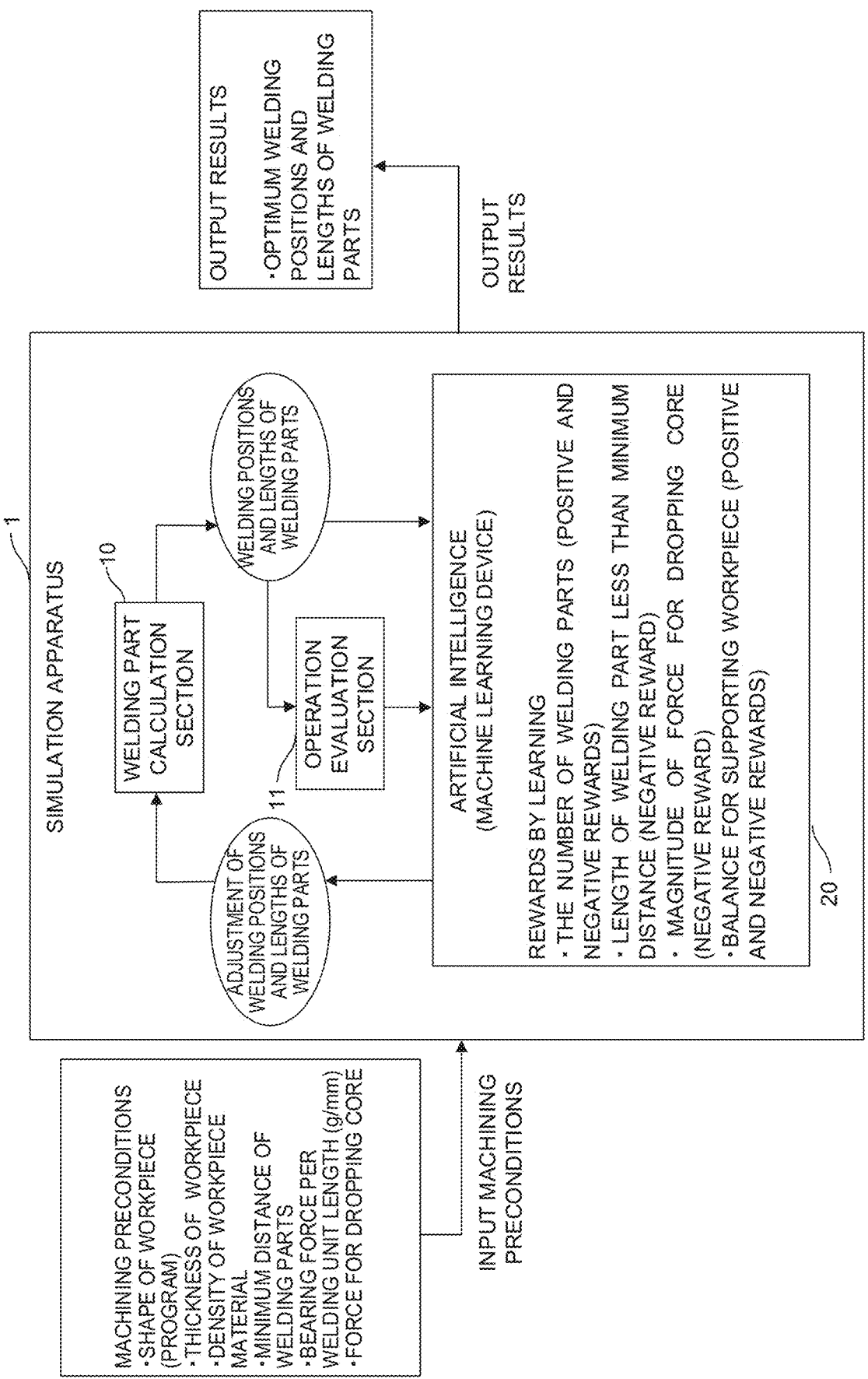
FIG. 4 is an image diagram on machine learning of the adjustment of a position and a length of each welding part of a core in the simulation apparatus of a wire electric discharge machine, into which a machine learning device is introduced, according to an embodiment of the present invention.

FIG. 4 is an image diagram on machine learning of the adjustment of a position and a length of each welding part of a core in the simulation apparatus of a wire electric discharge machine, into which a machine learning device is introduced, according to an embodiment of the present invention. Note that FIG. 4 shows only configurations necessary for describing the machine learning in the simulation apparatus of the wire electric discharge machine of the embodiment.

In the embodiment, a machine learning device 20 receives a position and a length of each welding part of a core based on machining preconditions determined by a simulation apparatus 1 as information (state information) for specifying an environment (the state $s_t$ described in "(1) Machine Learning"). Values of a position and a length of each welding part of the core may be acquired as results calculated by a welding part calculation section 10.

In the embodiment, the machine learning device 20 outputs the adjustment action of a position and a length of each welding part of the core (the action $a_t$ described in "(1) Machine Learning") to the environment.

Figure 5:
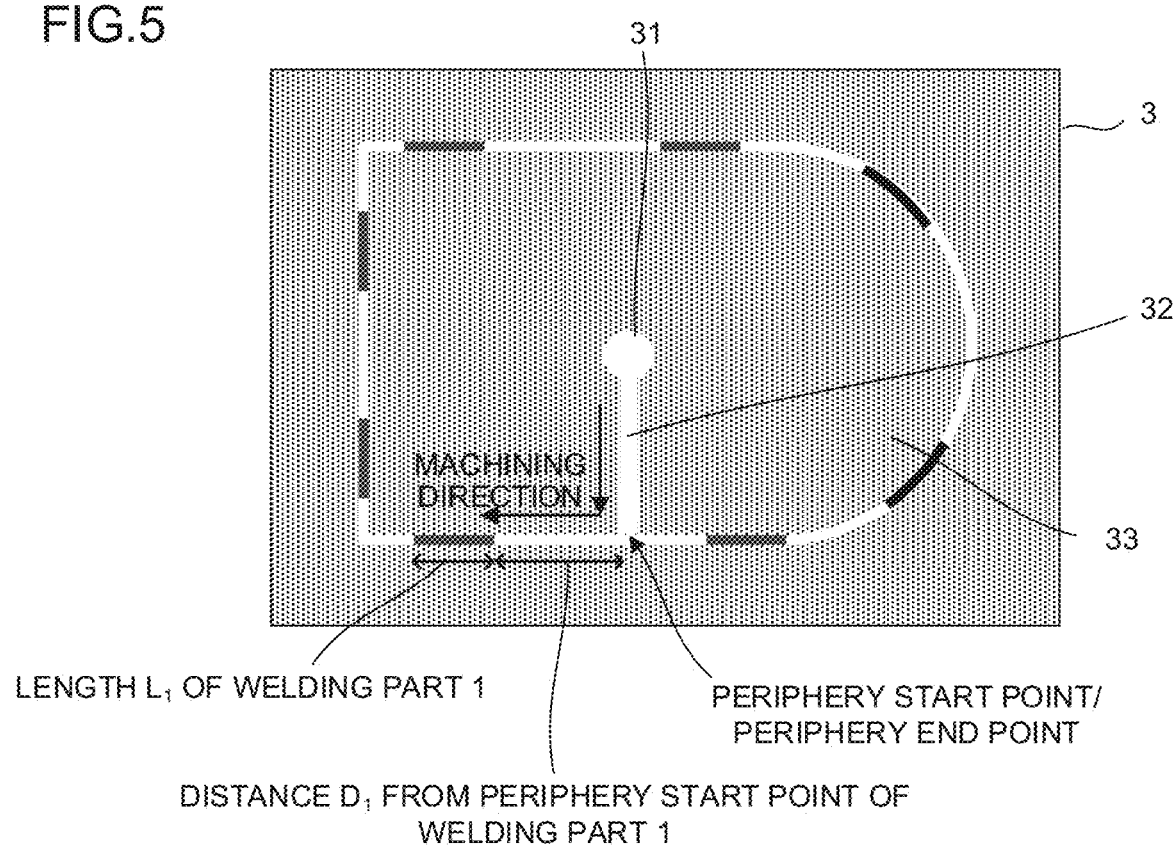
FIG. 5 is a diagram for describing an example of each data handled by the simulation apparatus in FIG. 4 (definition of positions and lengths of welding parts)

FIG. 5 is a diagram for describing an example of each data handled by the simulation apparatus 1 according to the embodiment.

According to the simulation apparatus 1 of the embodiment, a first machining position of a local path at which the core 33 is cut out from a workpiece 3 on a machining path in wire electric discharge machining is set as a periphery start point while the last machining position is set as a periphery end position. For a plurality of (n) welding parts 1 to n set on the machining path, a position of a welding part i (i=1 to n) is defined by a distance $D_i$ from the periphery start point. By a distance $D_i$ and a length $L_i$ of a welding part i, a position and a length of each welding part of the core on the machining path may be specified.

The above state information may be defined by values of a position $D_i$ and a length $L_i$ of each welding part calculated by the welding part calculation section 10. In addition, the above adjustment action may be defined by the selection of an adjustment target of the above values $D_i$ and $L_i$ output from the machine learning device 20 and adjustment amounts of the values $D_i$ and $L_i$.

In addition, in the embodiment, as a reward (reward $r_t$ described in the above "(1) Machine Learning") to be given to the machine learning device 20, the number of welding parts (positive reward and negative reward), a welding part length less than a minimum distance (negative reward), a magnitude of a force for dropping the core (negative reward), balance for supporting the workpiece (core) (positive reward and negative reward), or the like is employed.

Note that an operator may appropriately set as to which data is used to determine a reward.

Moreover, in the embodiment, the machine learning device 20 performs machine learning based on input data, output data, and a reward described above. In the machine learning, a state $s_t$ is defined by the combination of input data at certain time t, the adjustment of a position and a length of each welding part performed with respect to the defined state $s_t$ is equivalent to an action $a_t$, and a value evaluated and calculated based on input data newly obtained as a result of the adjustment of a position and a length of each welding part with the action $a_t$ is equivalent to a reward $r_{t+1}$. As in "(1) Machine Learning" described above, a state $s_t$, an action $a_t$, and a reward $r_{t+1}$ are applied to the update formula of a value function (evaluation function) corresponding to a machine learning algorithm to advance the learning.

A description will be given, with reference to the function block diagram of FIG. 6, of the outline of the configurations of the simulation apparatus according to the embodiment of the present invention.

Figure 6:
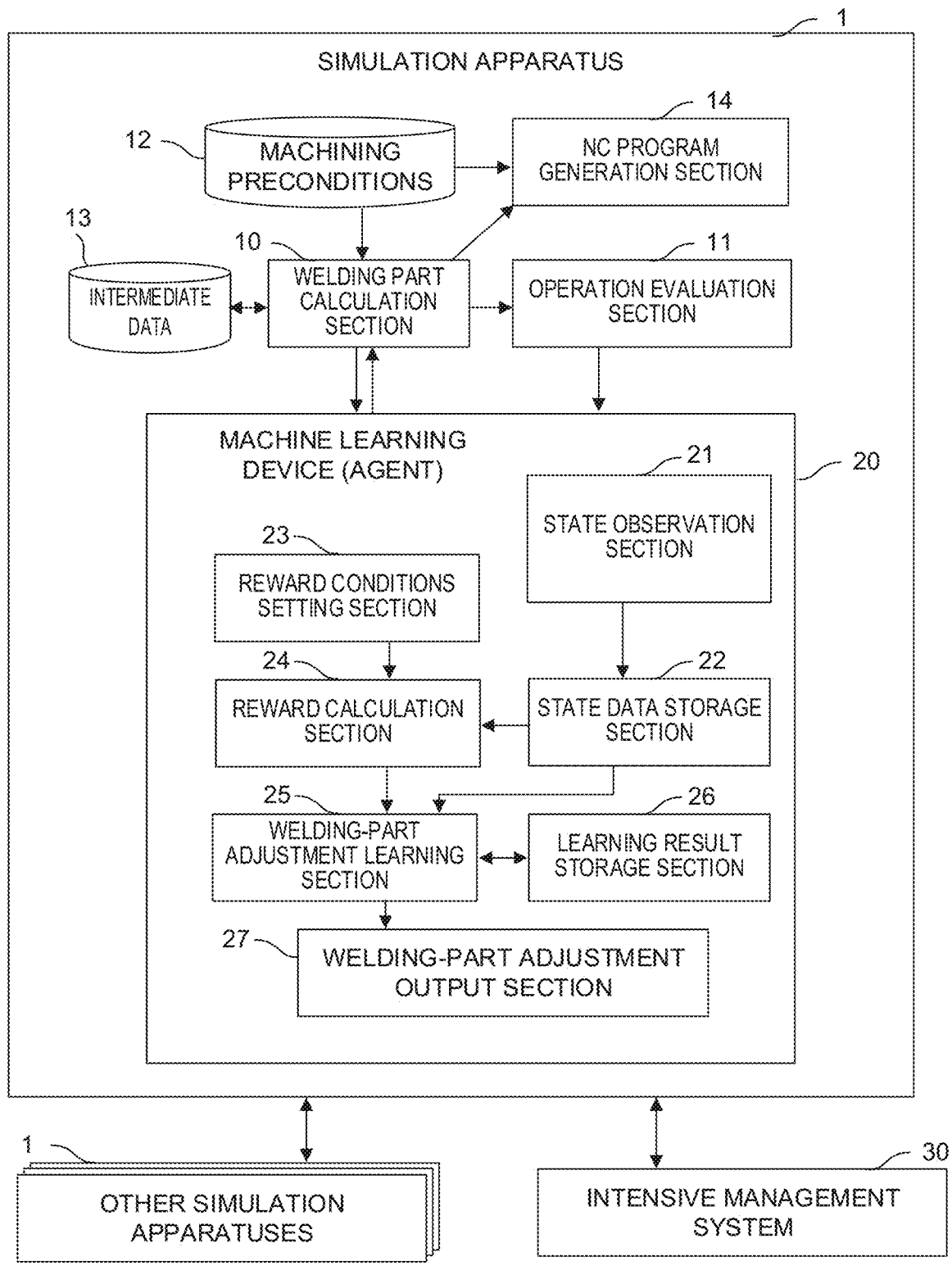
FIG. 6 is a function block diagram of the simulation apparatus according to the embodiment of the present invention.

When the configurations of the simulation apparatus shown in FIG. 6 are compared with the elements of the reinforcement learning shown in FIG. 1, the machine learning device 20 shown in FIG. 6 corresponds to the "agent" shown in FIG. 1, and the configurations of the welding part calculation section 10, an operation evaluation section 11, and the like other than the machine learning device 20 shown in FIG. 6 correspond to the environment shown in FIG. 1.

The simulation apparatus 1 of the wire electric discharge machine shown in FIG. 6 is provided with the function of simulating the operation of the wire electric discharge machine based on a program, and includes a personal computer provided with a simulation function, the numerical controller of a wire electric discharge machine, a CAD/CAM, a simulation computer, or the like.

The welding part calculation section 10 provided in the simulation apparatus 1 calculates a position and a length of each welding part for welding a core to a workpiece, based on machining preconditions 12 set by an operator and stored in a memory (not shown). The welding part calculation section 10 calculates a shape of a machining path based on a program included in the machining preconditions 12 and specifies the periphery start point and the periphery end point of the calculated machining path to specify a shape of the workpiece (core). Then, the welding part calculation section 10 determines a position and a length of each welding part provided on the periphery of the specified core. The welding part calculation section 10 may determine a position and a length of each welding part at the time of starting machine learning using the prior art technique disclosed in Japanese Patent Application Laid-open No. 2014-024132, or may cause an operator to input a position and a length of each welding part at the first time.

The welding part calculation section 10 temporarily stores a position and a length of each calculated welding part in a memory (not shown) as intermediate data 13, and further outputs the same to the operation evaluation section 11 and the machine learning device 20 that will be described later.

In addition, based on the adjustment of a position and a length of each welding part output from the machine learning device 20, the welding part calculation section 10 adjusts a position and a length of each welding part temporarily stored as the intermediate data 13. The welding part calculation section 10 first adds the adjustment of a position and a length of each welding part output from the machine learning device 20 to a temporarily-stored position and a length of each welding part. When contention such as overlapping of welding parts occurs as a result of the addition, the welding part calculation section 10 next corrects a position or a length of a welding part other than the welding part serving as an adjustment target to solve the contention. Then, the welding part calculation section 10 overwrites the adjusted position and the length of each welding part as the intermediate data 13 and outputs the same to the operation evaluation section 11 and the machine learning device 20 that will be described later.

The welding part calculation section 10 repeatedly performs the above operation so long as the adjustment of a position and a length of each welding part is output from the machine learning device 20.

The operation evaluation section 11 calculates an evaluation value with respect to a position and a length of each welding part output from the welding part calculation section 10. Examples of an evaluation value calculated by the operation evaluation section 11 include a value of a force by which the core is supported, a value of a force for dropping the core, and balance of positions for supporting the core (rotational moment by the bearing force of each welding part at the centroid position of the core). Such an evaluation value is calculated using a simulation function normally provided in the simulation apparatus 1.

The operation evaluation section 11 calculates an evaluation point based on a calculated evaluation value and records the history of the evaluation point. When the convergence of an evaluation point is confirmed based on the history (when the evaluation point does not increase for a prescribed number of times in the past, the evaluation point is maintained at a constant value, the evaluation point fluctuates between prescribed values, or the like), it is recognized by the operation evaluation section 11 that an optimum position and a length of each welding part are calculated at that time. Then, the operation evaluation section 11 instructs the welding part calculation section 10, an NC program generation section 14 and the machine learning device 20 to complete a machine learning operation and outputs a position and a length of each welding part as the optimum position and the length of each welding part. On the other hand, when the convergence of an evaluation point is not confirmed, the operation evaluation section 11 outputs a calculated evaluation value to the machine learning device 20.

With the reception of an instruction from the operation evaluation section 11 to complete a machine learning operation, the NC program generation section 14 generates an instruction to generate welding parts based on positions and lengths of the welding parts finally calculated by the welding part calculation section 10 and generates and outputs an (edited) program in which the generated instruction is embedded in a program (that is to be edited) included in the machining preconditions 12.

Figure 7A:
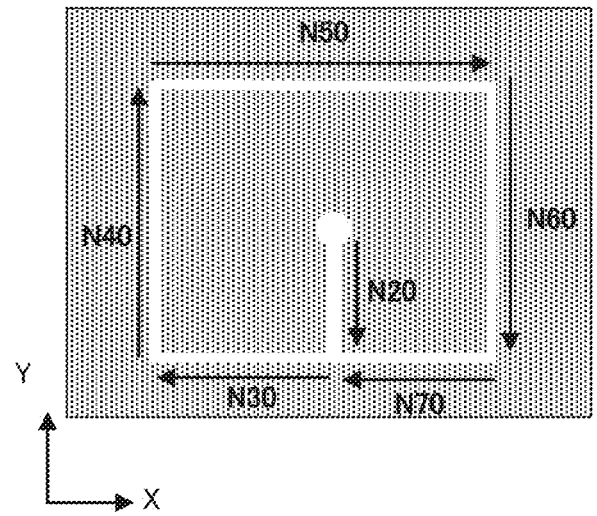
FIG. 7A shows an example of a program as a target for which a simulation is to be performed (a program to be edited)
Figure 7B:
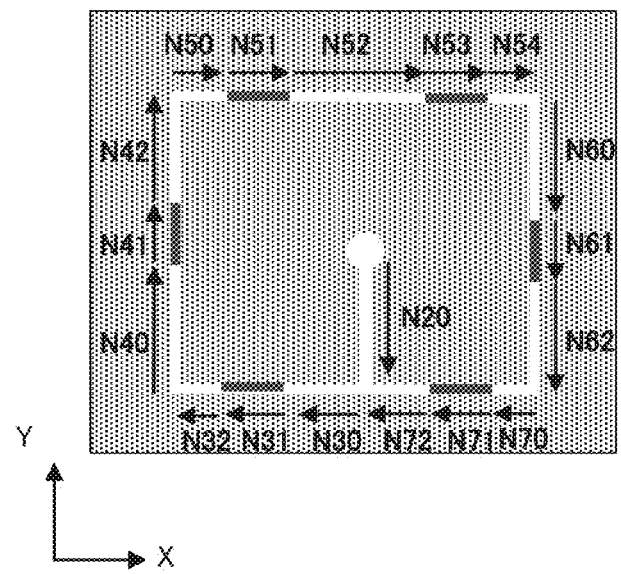
FIG. 7B shows an example of an edited program in which a code for welding a core in a workpiece based on a position and a length of each welding part adjusted based on a machine learning result is embedded in the program shown in FIG. 7A.

FIG. 7A shows an example of a program as a target for which a simulation is to be performed. FIG. 7B shows an example of an edited program in which a code for welding a core in a workpiece based on a position and a length of each welding part adjusted based on a machine learning result is embedded in the program shown in FIG. 7A.

In the program that is to be edited shown in FIG. 7A, Mxx indicates a wire connection M-code, and Mxy indicates a wire disconnection M-code. In addition, in the program that is to be edited, as shown in the right side of FIG. 7A, a wire electrode is moved in an X-axis direction and a Y-axis direction to cut out the core according to the feeding instruction of N20 to N70.

On the other hand, in the edited program shown in FIG. 7B, Myy indicates a machining conditions setting M-code for starting each welding part, and Mzz indicates a machining conditions setting M-code for ending each welding part. As shown in FIG. 7B, the NC program generation section 14 divides a machining path in the program shown in FIG. 7A and embeds the machining conditions setting M-code Myy for starting each welding part and the machining conditions setting M-code Mzz for ending each welding part in parts corresponding to the start and end positions of each welding part based on a position and a length of each welding part to generate the edited program shown in the right side of FIG. 7B to perform machining.

When the welding part calculation section 10 calculates and outputs a position and a length of each welding part and then the operation evaluation section 11 outputs an evaluation value, the machine learning device 20 performs the adjustment operation of the position and the length of each welding part and learns the adjustment operation.

The machine learning device 20 is provided with a state observation section 21, a state data storage section 22, a reward conditions setting section 23, a reward calculation section 24, a welding-part adjustment learning section 25, a learning result storage section 26, and a welding-part adjustment output section 27. The machine learning device 20 may be provided inside the simulation apparatus 1 as shown in FIG. 6, or may be provided in a personal computer or the like outside the simulation apparatus 1.

The state observation section 21 observes a position and a length of each welding part obtained from the welding part calculation section 10 and an evaluation value output from the operation evaluation section 11 as state data and acquires the same inside the machine learning device 20.

The state data storage section 22 receives and stores state data and outputs the stored state data to the reward calculation section 24 and the welding-part adjustment learning section 25. The state data input to the state data storage section 22 may be data acquired by the latest operation of the simulation apparatus 1 or data acquired by the past operation of the simulation apparatus 1. In addition, it is also possible for the state data storage section 22 to receive and store state data stored in other simulation apparatuses 1 or an intensive management system 30, or is possible for the state data storage section 22 to output state data stored in the state data storage section 22 to other simulation apparatuses 1 or the intensive management system 30.

The reward conditions setting section 23 sets and stores conditions for giving rewards in machine learning input by an operator. Positive and negative rewards are given and may be appropriately set. In addition, an input to the reward conditions setting section 23 may be performed via a personal computer, a tablet terminal, or the like used in the intensive management system 30. However, with an input via a manual data input (MDI) appratatus (not shown) of the simulation apparatus 1, it becomes possible to easily set conditions for giving rewards.

The reward calculation section 24 analyzes state data input from the state observation section 21 or the state data storage section 22 based on conditions set by the reward conditions setting section 23, and outputs calculated rewards to the welding-part adjustment learning section 25.

Hereinafter, a description will be given of an example of reward conditions set by the reward conditions setting section 23 in the embodiment.

(Reward 1: The Number of Welding Parts (Positive Reward and Negative Reward))

When the number of welding parts is smaller than a previously-set threshold, a positive reward is given according to the degree of the number of the welding parts. On the other hand, when the number of the welding parts is greater than the previously-set threshold, a negative reward is given according to the degree of the number of the welding parts.

(Reward 2: Length of Welding Part Less than Minimum Distance (Negative Reward))

When a length of a welding part is shorter than a welding part minimum distance set as the machining preconditions 12, a negative reward is given according to the degree of the length of the welding part. When there is a plurality of welding parts having a length shorter than the welding part minimum distance, a negative reward is increased correspondingly.

(Reward 3: Magnitude of Force by which Core is Supported (Negative Reward))

When a force by which the core is supported, calculated by the operation evaluation section 11, is smaller than a weight of the core calculated from a shape (program) of a workpiece, a thickness of the workpiece, and a density of a workpiece material, a negative reward is given according to the degree of the force.

(Reward 4: Force for Dropping Core (Negative Reward))

When a force for dropping the core calculated by the operation evaluation section 11 is greater than a previously-set threshold, a negative reward is given according to the degree of the force.

(Reward 5: Balance for Supporting Core (Positive Reward and Negative Reward))

When rotational moment by the bearing force of each welding part at the centroid position of the core, calculated by the operation evaluation section 11, is smaller than a previously-set threshold (close to 0), a positive reward is given according to the degree of the rotational moment. On the other hand, when the rotational moment is greater than the previously-set threshold, a negative reward is given according to the degree of the rotational moment.

The welding-part adjustment learning section 25 performs machine learning (reinforcement learning) based on state data input from the state observation section 21 or the state data storage section 22, the result of the adjustment of a position and a length of each welding part performed by the welding-part adjustment learning section 25 (an adjustment action output from the welding-part adjustment output section 27), and a reward calculated by the reward calculation section 24.

Here, in the machine learning performed by the welding-part adjustment learning section 25, a state $s_t$ defined by the combination of state data at certain time t, and the determination of the adjustment operation of a position and a length of each welding part according to the defined state $s_t$ is equivalent to an action $a_t$. Then, the adjustment of the position and the length of each welding part is determined by the welding-part adjustment output section 27 that will be described later, and the determined adjustment of the position and the length of each welding part is output to the welding part calculation section 10. After that, the welding part calculation section 10 performs the adjustment of the position and the length of each welding part and outputs a new position and a length of each welding part. A value calculated by the reward calculation section 24 based on resultant data (the outputs from the welding part calculation section 10 and the operation evaluation section 11) is equivalent to a reward $r_{t+1}$.

A value function used in the learning is determined according to an applied learning algorithm. For example, when Q-learning is used, it is only necessary to update an action value function $Q(s_t, a_t)$ according to the above formula (2) to advance the learning.

Figure 8:
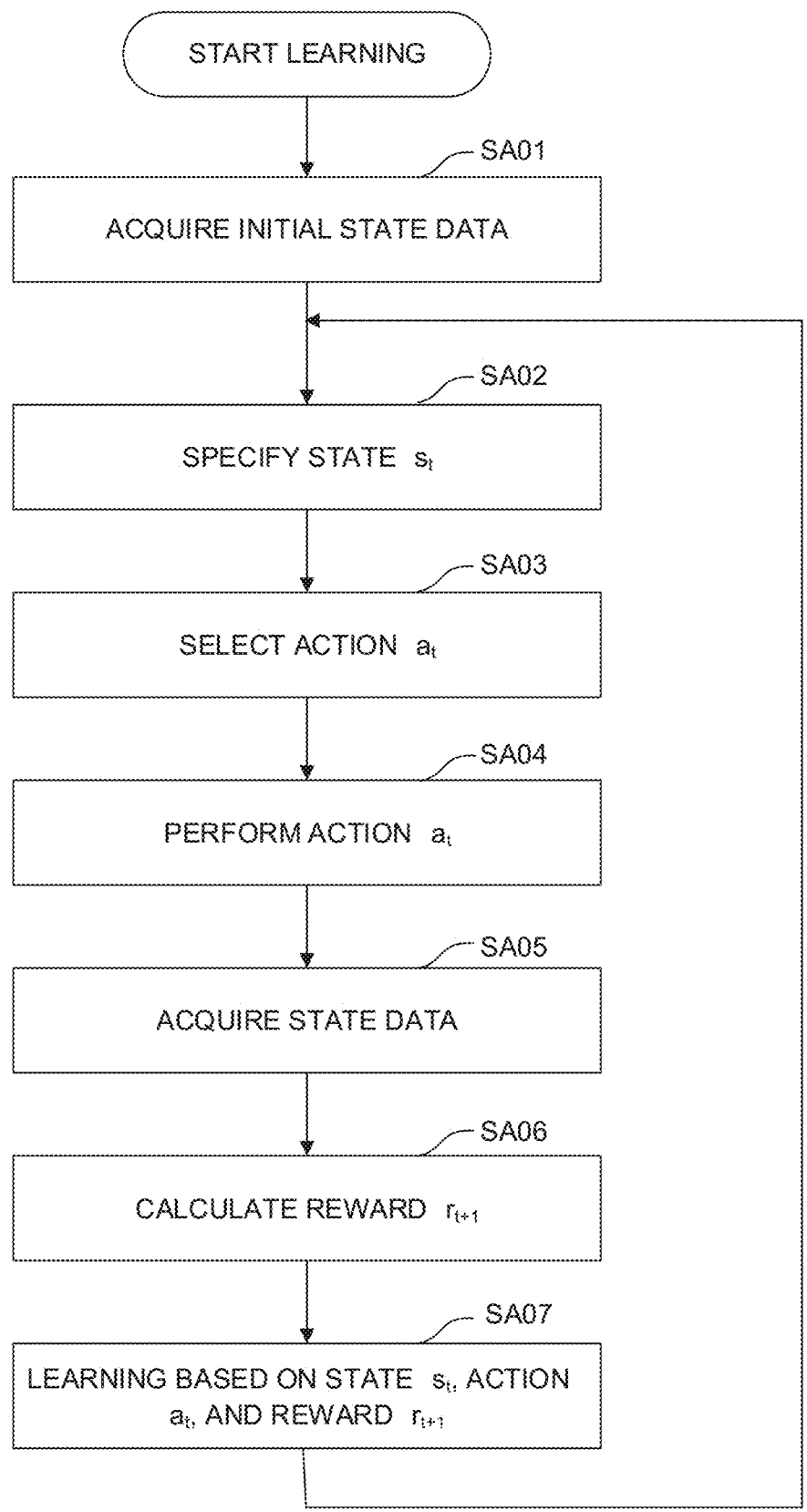
FIG. 8 is a flowchart showing the flow of machine learning performed by a welding-part adjustment learning section in the simulation apparatus of FIG. 6.
Figure 9:
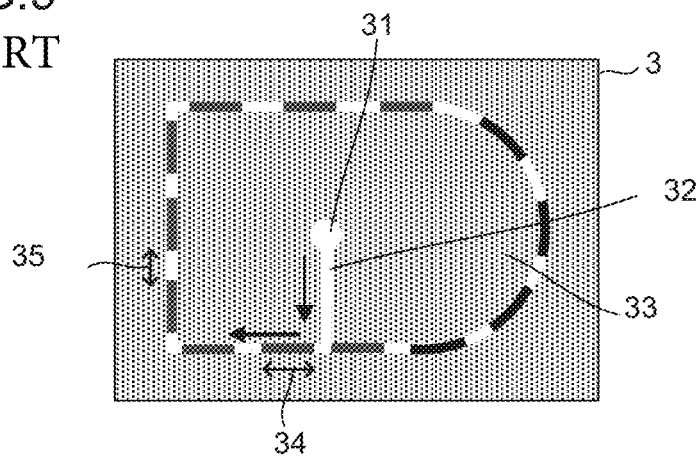
FIG. 9 is a diagram for describing a prior art technique in which a core is welded to a workpiece to prevent the core from dropping.
Figure 10A:
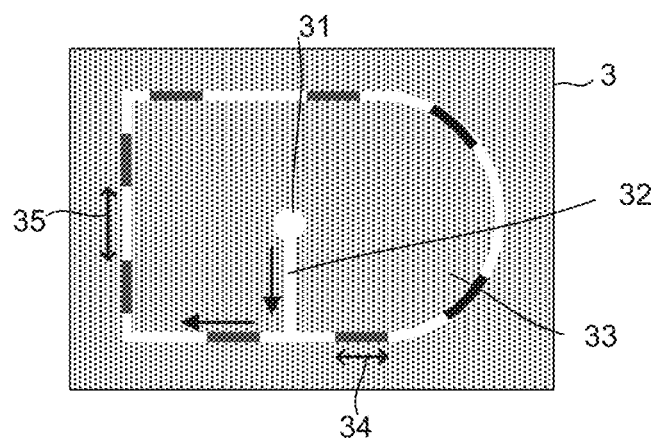
FIGS. 10A and 10B are diagrams for describing a difference in the positions of welding parts corresponding to a shape of a core.
Figure 10B:
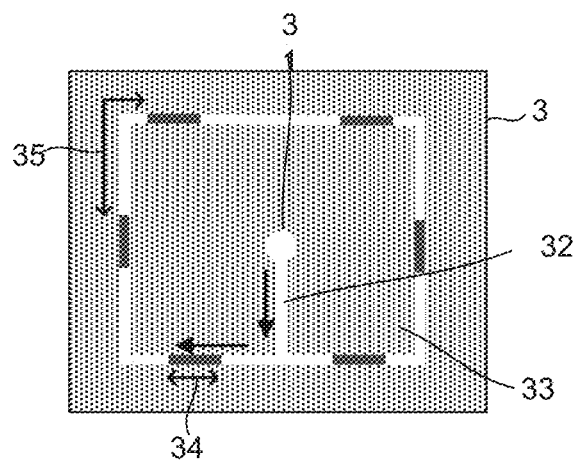

A description will be given, with reference to the flowchart of FIG. 8, of the flow of machine learning performed by the welding-part adjustment learning section 25. Hereinafter, the description will be made according to individual steps (Step SA01) When machine learning starts, the state observation section 21 acquires state data on the simulation apparatus 1.

(Step SA02) The welding-part adjustment learning section 25 specifies a current state $s_t$ based on the state data acquired by the state observation section 21.

(Step SA03) The welding-part adjustment learning section 25 selects an action $a_t$ (adjustment of a position and a length of each welding part) based on a past learning result and the state $S_t$ specified in step SA02.

(Step SA04) The action at selected in step SA03 is performed.

(Step SA05) The state observation section 21 acquires data output from the welding part calculation section 10 and the operation evaluation section 11 as state data on the simulation apparatus 1. At this stage, the state of the simulation apparatus 1 changes with a temporal transition from time t to time t+1 as a result of the action $a_t$ performed in step SA04.

(Step SA06) The reward calculation section 24 calculates a reward $r_{t+1}$ based on the state data acquired in step SA05.

(Step SA07) The welding-part adjustment learning section 25 advances the machine learning based on the state $S_t$ specified in step SA02, the action $a_t$ selected in step SA03, and the reward $r_{t+1}$ calculated in step SA06 and then returns to step SA02.

Referring back to FIG. 6, the learning result storage section 26 stores a result of learning by the welding-part adjustment learning section 25. Further, when a learning result is used by the welding-part adjustment learning section 25 again, the learning result storage section 26 outputs a stored learning result to the welding-part adjustment learning section 25. As described above, a learning result may be stored in such a way that a value function corresponding to a machine learning algorithm to be used is stored in a supervised learning device such as a support vector machine (SVM) and a neural network of an approximate function, an arrangement, or a multiple-value output, or the like.

Note that it is also possible for the learning result storage section 26 to receive and store a learning result stored in other simulation apparatuses 1 or the intensive management system 30, or is possible for the learning result storage section 26 to output a learning result stored in the learning result storage section 26 to other simulation apparatuses 1 or the intensive management system 30.

Based on a result of learning by the welding-part adjustment learning section 25 and current state data, the welding-part adjustment: output section 27 determines the adjustment target of a position and a length of each welding part and adjustment amounts of the position and the length. Here, the determination of the adjustment target of a position and a length of each welding part and adjustment amounts of the position and the length is equivalent to an action a used in machine learning. For example, the adjustment of a position and a length of each welding part may be performed in such a way that the combinations of welding parts as adjustment targets and change amounts of the positions and the lengths of the welding parts are prepared as selectable actions (for example, an action 1=a length of a welding part 1 is increased by 0.1 mm, an action 2=a position of the welding part 1 is increased by 0.5 mm, a length of a welding part 8 is set at 0 mm (deleted), . . . ) and that an action by which the greatest reward will be obtained in the future based on a past learning result is selected. The selectable actions may be actions by which a plurality of welding parts is simultaneously adjusted (for example, an action j=lengths of all welding parts are increased by 1 mm, . . . ), or may be actions by which a length and a position are simultaneously adjusted. In addition, the above ε greedy method may be employed to select a random action with a constant probability for the purpose of advancing the learning of the welding-part adjustment learning section 25. Note that when the result of selecting an action shows that there is no welding part as an adjustment target, the action is not selected but another action is selected.

Then, the welding-part adjustment output section 27 outputs the adjustment of a position and a length of each welding part determined by the selection of an action to the welding part calculation section 10.

After that, the welding part calculation section 10 newly calculates a position and a length of each welding part based on the adjustment of the position and the length of each welding part output from the welding-part adjustment output section 27, the operation evaluation section 11 calculates an evaluation value, the state observation section 21 acquires data on a situation, and machine learning is repeatedly performed. Thus, the acquisition of a more excellent learning result is allowed.

When the wire electric discharge machine actually operates using learning data for which learning has been completed, the machine learning device 20 may be attached to the wire electric discharge machine so as not to perform new learning such that the wire electric discharge machine operates using the learning data for which the learning has been completed as it is.

In addition, the machine learning device 20 having completed learning (or the machine learning device 20 in which completed learning data on other machine learning devices 20 has been copied in the learning result storage section 26) may be attached to other wire electric discharge machines such that the wire electric discharge machines operate using the learning data for which the learning has been completed as it is.

Further, the machine learning device 20 of the simulation apparatus 1 may perform machine learning alone. However, when each of a plurality of simulation apparatuses 1 is further provided with a section used to communicate with an outside, it becomes possible to send/receive and share state data stored in each of the state data storage sections 22 and a learning result stored in each of the learning result storage sections 26. Thus, more efficient machine learning is allowed. For example, learning is advanced in parallel between a plurality of simulation apparatuses 1 in such a way that state data and learning data are exchanged between the simulation apparatuses 1 while adjustment amounts different between the simulation apparatuses 1 are fluctuated within a prescribed range. Thus, efficient learning is allowed.

In order to exchange state data and learning data between a plurality of simulation apparatuses 1 as described above, communication may be performed via a host computer such as the intensive management system 30, the simulation apparatuses 1 may directly communicate with each other, or a cloud may be used. However, for handling large amounts of data, a communication section with a faster communication speed is preferably provided.

The embodiment of the present invention is described above. However, the present invention is not limited only to the example of the above embodiment and may be carried out in various aspects with appropriate modifications.

The invention claimed is:

1. A machine learning device that performs machine learning of an adjustment of a position and a length of a welding part formed on a machining path for machining to weld a core to a workpiece when the core is cut out from the workpiece by a wire electric discharge machine that performs the machining to cut out the core from the workpiece based on machining preconditions including a program, the machine learning device comprising:

a processor configured to:
acquire, as state data on the welding part, the position and the length of the welding part and an evaluation value to evaluate the position and the length of the welding part;
set reward conditions;
calculate a reward based on the state data and the reward conditions;
perform the machine learning of an adjustment of the position and the length of the welding part; and
determine and output (i) an adjustment target including at least one of the position and the length of the welding part and (ii) adjustment amounts of the adjustment target as an adjustment action, based on the state data and a result of the machine learning,
perform the machine learning of the adjustment of the position and the length of the welding part based on
(a) the output adjustment action,
(b) the state data acquired based on the recalculated position and the recalculated length of the welding part, and
(c) the reward calculated based on the state data acquired based on the recalculated position and the recalculated length of the welding part and
upon completion of the machine learning, output an optimum position of the welding part,
wherein
the reward conditions are set
such that the processor is configured to calculate a positive reward
(a) when a number of the welding parts is small or
(b) when a position for supporting the core is well balanced and such that the processor is configured to calculate a negative reward
(c) when the number of the welding parts is large, or
(d) when the length of the welding part is shorter than a previously-set welding-parts minimum distance, or
(e) when a magnitude of a force by which the core is supported is smaller than a previously-set prescribed threshold, or
(f) when a magnitude of a force for dropping the core is large, or
(g) when the position for supporting the core is poorly balanced.

2. The machine learning device according to claim 1, wherein
the evaluation value includes at least any of
the force by which the core is supported calculated from the position and the length of the welding part, the force for dropping the core calculated from the position and the length of the welding part, and balance of positions for supporting the core calculated from the position and the length of the welding part.

3. The machine learning device according to claim 1, further comprising:

a memory configured to store the result of the machine learning, and output the stored result of the machine learning to the processor when the processor uses the result of the machine learning section.

4. The machine learning device according to claim 1, wherein the machine learning device is connected to at least one further machine learning device and the processor is further configured to mutually exchange or share the result of the machine learning with the at least one further machine learning device.

* * * * *